US008720543B2

(12) United States Patent
Meling et al.

(10) Patent No.: US 8,720,543 B2
(45) Date of Patent: May 13, 2014

(54) DEVICE FOR PASSIVE PRESSURE SEALING

(75) Inventors: Morten Olav Meling, Stavanger (NO); Harald Syse, Røyneberg (NO)

(73) Assignee: Reelwell AS (NO)

( * ) Notice: Subject to any disclaimer, the term of this patent is extended or adjusted under 35 U.S.C. 154(b) by 183 days.

(21) Appl. No.: 13/201,739

(22) PCT Filed: Feb. 15, 2010

(86) PCT No.: PCT/NO2010/000057
§ 371 (c)(1),
(2), (4) Date: Oct. 31, 2011

(87) PCT Pub. No.: WO2010/095949
PCT Pub. Date: Aug. 26, 2010

(65) Prior Publication Data
US 2012/0038111 A1    Feb. 16, 2012

(30) Foreign Application Priority Data

Feb. 17, 2009   (NO) .................................. 20090750

(51) Int. Cl.
*E21B 33/08* (2006.01)
(52) U.S. Cl.
USPC ....... 166/88.1; 166/89.1; 166/84.1; 166/84.2; 166/185; 166/191; 277/431; 277/432
(58) Field of Classification Search
USPC ............ 166/88.1, 89.1, 84.1, 84.2, 84.5, 185; 166/191; 277/431, 432
See application file for complete search history.

(56) References Cited

U.S. PATENT DOCUMENTS

| 3,582,088 | A | * | 6/1971 | Matsuzaki et al. ............. 277/628 |
| 5,791,411 | A | * | 8/1998 | Ricalton et al. ............... 166/84.1 |
| 6,007,105 | A |   | 12/1999 | Dietle et al. |
| 6,102,139 | A | * | 8/2000 | Tibussek et al. .............. 175/296 |
| 2004/0245727 | A1 |   | 12/2004 | Bunn |
| 2007/0272403 | A1 | * | 11/2007 | Robichaux et al. .......... 166/85.1 |
| 2008/0067754 | A1 | * | 3/2008 | Schroeder et al. ............ 277/437 |

FOREIGN PATENT DOCUMENTS

DE              706180 C    5/1941

OTHER PUBLICATIONS

W. C. Morrow et al.; "A New Hydrodynamic Washpipe Sealing System Extends Performance Envelope and Provides Economic Benefit"; IADC/SPE 59107; IADC/SPE Drilling Conference, 2000 (5 pages).
International Search Report issued in PCT/N02010/000057, mailed Sep. 1, 2010, 4 pages.
Written Opinion issued in PCT/N02010/000057, mailed Sep. 1, 2010, 5 pages.
Norwegian Search Report issued in parent application No. 20090750, dated Sep. 16, 2009, 1 page.

* cited by examiner

*Primary Examiner* — James Sayre
(74) *Attorney, Agent, or Firm* — Adenike Adebiyi

(57) ABSTRACT

A sealing system between a relatively rotating element and a stationary element has at least three sealing elements arranged between the rotating element and the stationary element and arranged in series between a process fluid and an environment, and a barrier fluid arrangement to provide a barrier fluid to spaces formed between the sealing elements. The barrier fluid arrangement has at least two compensator devices where under use the pressure in the process fluid is acting on one side of a piston in the compensator device and the pressure in the barrier fluid is acting on the opposite side of the piston. There is a difference between cross sectional areas of the two sides of the piston and the difference varies between the at least two compensator devices.

20 Claims, 3 Drawing Sheets

DEVICE FOR PASSIVE PRESSURE SEALING

BACKGROUND

1. Field of the Invention

The present invention relates to a sealing system between a relatively rotating element and a stationary element, possibly a drill pipe and a wash pipe.

2. Related Art

Drilling is done by having a rotating drill pipe extending between the drill bit and the surface facility. The surface facility is either on land, on a floating vessel, a platform or other kind of installation. There will naturally be relative rotation between the drill pipe and the surface facility. At the same time there are fluid lines in the drill pipe which need to be connected to equipment on the surface facility for transfer of a fluid from a fluid path in the drill pipe to the surface facility. One possible solution for this is to provide swivel means in the connection between the drill pipe and the surface facility. Such swivel means may for instance be a so-called washpipe connected to the drill pipe. These swivel means should also prevent leakage of fluids to the environment and preferably be easy to use, assemble and repair. The swivel means also has to withstand high pressure and high speed drilling with the associated extensive abrasion and wear in the connection between the relatively rotating elements.

There is known a washpipe assembly for a standard drill pipe where the system includes hydrodynamic seal lubrications where each seal has a dynamic sealing surface incorporating a wavy hydrodynamic inlet and a non-hydrodynamic exclusionary corner, pressure staging between the hydrodynamic seals where the drilling fluid pressure is divided among three pressure retaining seals, exposing each one to only a fraction of the pressure, where each sealed chamber is independently pressurized by a lubrication cylinder (lubricator energized by the drilling fluid pressure and pivoting articulation), as described in the paper IADC/SPE 59107 "A new hydrodynamic Washpipe Sealing system. Extends Performance Envelope and Provides Economic Benefit" by Morrow, Drury, Dietle and Kalsi. Such an assembly will enable it to withstand significantly higher pressures and surface speeds compared with conventional units.

SUMMARY

According to one or more embodiments of the present invention, there is provided a sealing system between a relatively rotating element and a stationary element, comprising at least three sealing elements arranged between the two elements and arranged in series between a process fluid and an environment. There is a barrier fluid arrangement to provide a barrier fluid between the sealing elements, where the barrier fluid arrangement comprises at least two compensator devices where the pressure in the process fluid is acting on one side of a piston in the compensator device and the pressure in the barrier fluid is acting on the opposite side of the piston.

According to one or more embodiments of the invention there is a difference in the cross sectional area of the two sides of the piston and this difference varies between the at least two compensator devices. This gives that with a given compensator device there is a given pressure difference between the pressure in the process fluid and the pressure in the barrier fluid. This pressure difference is set with the difference in cross section areas of the two sides of the piston for each compensator during assembly of the sealing system and thereby forming a passive sealing system. The sealing system is provided with filling means for adding barrier fluid to the system. These filling means may provide a possibility for providing barrier fluid to each one of the compensator devices at a given pressure before active use of the sealing system. The filling means may provide a possibility of providing barrier fluid from one fluid source at a given pressure to at least two compensator devices at the same time, which filling means when the sealing device is in active use are closed, or the barrier fluid source is removed from the filling means. The filling means may when the filling means provide the possibility of providing barrier fluid to two or more compensators at the same time be closed by a one-way valve in the connection to each of the compensator devices, preventing fluid from flowing out of the sealing system when the barrier fluid has been added through the filling means and also preventing barrier fluid to flow between the different compensator devices. The filling means may thereby be a one point contact between the sealing system and the source of barrier fluid, with valves in the connection to each of the compensator devices. Alternatively there may be more than one filling means connected to groups of compensator devices or possibly one filling means for each compensator device. The issue is that the barrier fluid is filled to the sealing system with a given pressure and then during active use the system as such will then provide a pressure in the barrier fluid in response to the pressure in the process fluid and by the construction of the different compensator devices the process fluid pressure is divided between the different compensator device and one thereby achieves a passive system which responds to the differences in the process fluid pressure.

According to an aspect of the invention the rotating element may be a drill pipe and the stationary element may be a washpipe and there may be a radial opening from the drill pipe through the wash pipe. This radial opening may be in addition to an axial opening. Such a configuration with a radial opening and an axial opening may be found in a dual drill pipe. A dual drill pipe may comprise a normal drill pipe with an inner pipe arranged within the drill pipe forming an annular space between the drill pipe and the inner pipe, in addition to the space within the inner pipe. This annular space may be connected to surface equipment through a radial opening. The inner space of the inner pipe may in a conventional manner have an axial opening at the top of the drill pipe. The annular space with the radial opening may be used to provide drilling fluid down to the drill bit, and the drill fluid with cuttings may be transported back to the surface through the inner space of the inner pipe. It is also possible to envisage an opposite transportation of fluids.

According to an aspect the piston in the compensator device may be arranged with a piston rod on one side. The cross sectional area of the piston rod may then be used to adapt the difference in the cross sectional area of the two sides of the piston.

According to another aspect the compensator devices may comprise cylinders for positioning of the piston, which cylinders have a similar inner diameter for at least two of the compensator devices in the sealing system. This will give similar pistons in several compensators, possibly all the compensators in the sealing system. The cross sectional difference may then be achieved by attaching piston rods with different cross sectional areas to the different pistons.

According to another aspect at least one of the pistons may be an annular piston positioned around an inner piston. There may be several annular pistons arranged outside each other with a common centre axis. Another possibility is to have several sets of annular pistons or alternatively some annular pistons and some other pistons.

According to another aspect there may be one fluid supply of barrier fluid to the at least two compensator devices. The one fluid supply may be to all the compensators or there is one barrier fluid supply to some compensators and another fluid supply to some other compensators.

According to another aspect a first compensator device may be connected to a first space between a first sealing element, exposed to the process fluid, and a second sealing element, and it may be arranged to have the barrier fluid acting on the side of the piston with a smaller exposed area of the piston than the side of the piston acting on the process fluid. This will give a somewhat higher pressure in the barrier fluid than in the process fluid, limiting the exposure of the seal to the process fluid. During normal operations barrier fluid will leak towards the process fluid and not the other way. The compensator devices connected to other spaces between sealing elements may be arranged to have the barrier fluid acting on the side of the piston with a larger exposed area of the piston than the side of the piston exposed to the pressure within the process fluid. This gives a predefined pressure drop from the process fluid to the barrier fluid.

According to another aspect the piston rods may be extending out of the compensator as a visual indicator. This may also indicate which piston is connected to which seals in the sealing system, as these piston rods may have different cross section area.

According to another aspect the at least two compensator devices may be arranged at least partly within the outer relative stationary element. They may be arranged in a line or divided around the circumference of the outer element or as a combination. The barrier fluid supply may also be arranged at least partly within this element, or alternatively the at least one filling means are arranged easily accessible in the outer surface of the outer relative stationary element. Such a configuration will avoid external lines for supply of barrier fluid to the outer element.

According to another aspect one compensator device may be providing a barrier fluid to two spaces between two sealing elements, one space on either side of the opening. With a radial opening such a configuration is a good solution. Such a configuration will give the need for half the amount of compensators compared with a solution with one compensator for each space. With a radial opening there will also be symmetry around the opening. The sealing elements and the spaces will also extend all the way around the drill pipe, forming ring shaped sealing elements and spaces for the barrier fluid.

According to another aspect the cross sectional area on one side of the pistons in the compensator devices, exposed to the pressure in the barrier fluid may be mainly equal for almost all the compensator devices. This give similar pistons in all the compensators, and easy production. The cylinder for the movement of the pistons may be formed by a separate element or at least partly by the outer relative stationary element.

According to one or more embodiments of the present invention, a method for operating a sealing system between a relatively rotating element and a stationary element comprises arranging at least three sealing elements in series between the two elements and between a process fluid and an environment, arranging a barrier fluid arrangement to provide a barrier fluid in spaces between the sealing elements, providing at least two compensator devices in the barrier fluid arrangement and arranging them such that the pressure in the process fluid is acting on one side of a piston in the compensator device and the pressure in the barrier fluid is acting on the opposite side of the piston, providing a difference in the cross sectional areas of the two sides of the piston and adapting the difference in the cross sectional areas of the pistons of the different compensator devices such that the pressure difference between the process fluid and the environment is divided between the different compensator devices.

According to another aspect the method may comprise providing a barrier fluid with a given pressure in the system before active use of the sealing system, and then removing the barrier fluid source from the sealing system until the sealing system again should be filled or filled up with barrier fluid.

DETAILED DESCRIPTION

Hereafter, embodiments of the invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
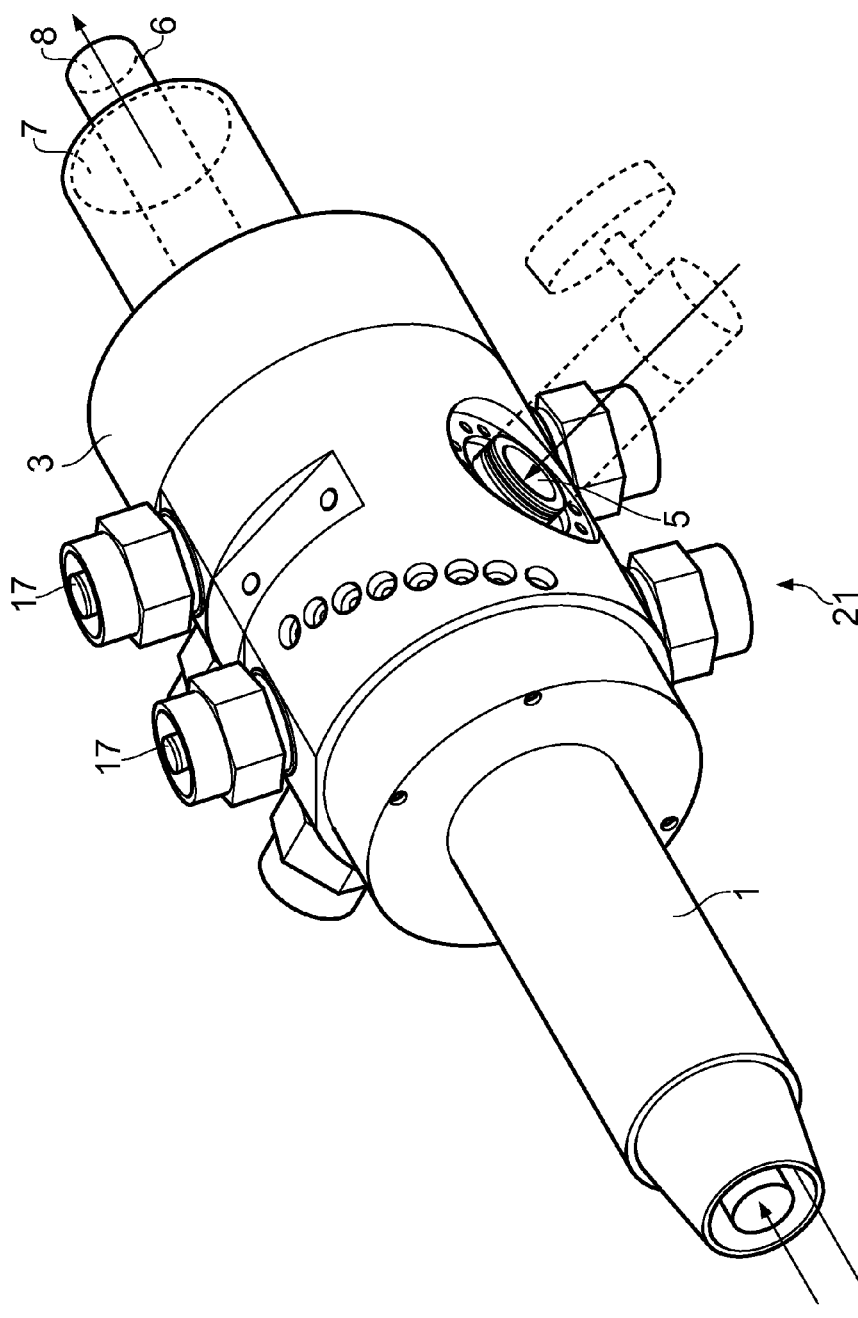
FIG. 1 is an elevated sketch a washpipe in connection with a drill pipe.

In FIG. 1 there is shown an elevated sketch of a drill pipe 1, forming the rotating element, with a washpipe 3, forming the stationary element attached to the drill pipe 1. There is in the drill pipe 1 indicated another inner pipe 6. Between the drill pipe 1 and the inner pipe 6 three is formed an annular space 7 and there is an inner space 8 within the inner pipe 6. Normally the annular space 7 will be used for transporting fluid, a process fluid into the well which is added to the annular space through a opening 5 in the washpipe 3, as indicated with the arrows and a return fluid is moved out of the well through the inner space 8 of the inner pipe 6 as also indicated with the arrows. There may to the opening 5 be attached a pipe from the stationary surface equipment, comprising for instance a valve means for regulating the flow into the annular space 7 through the opening 5.

Figure 2:
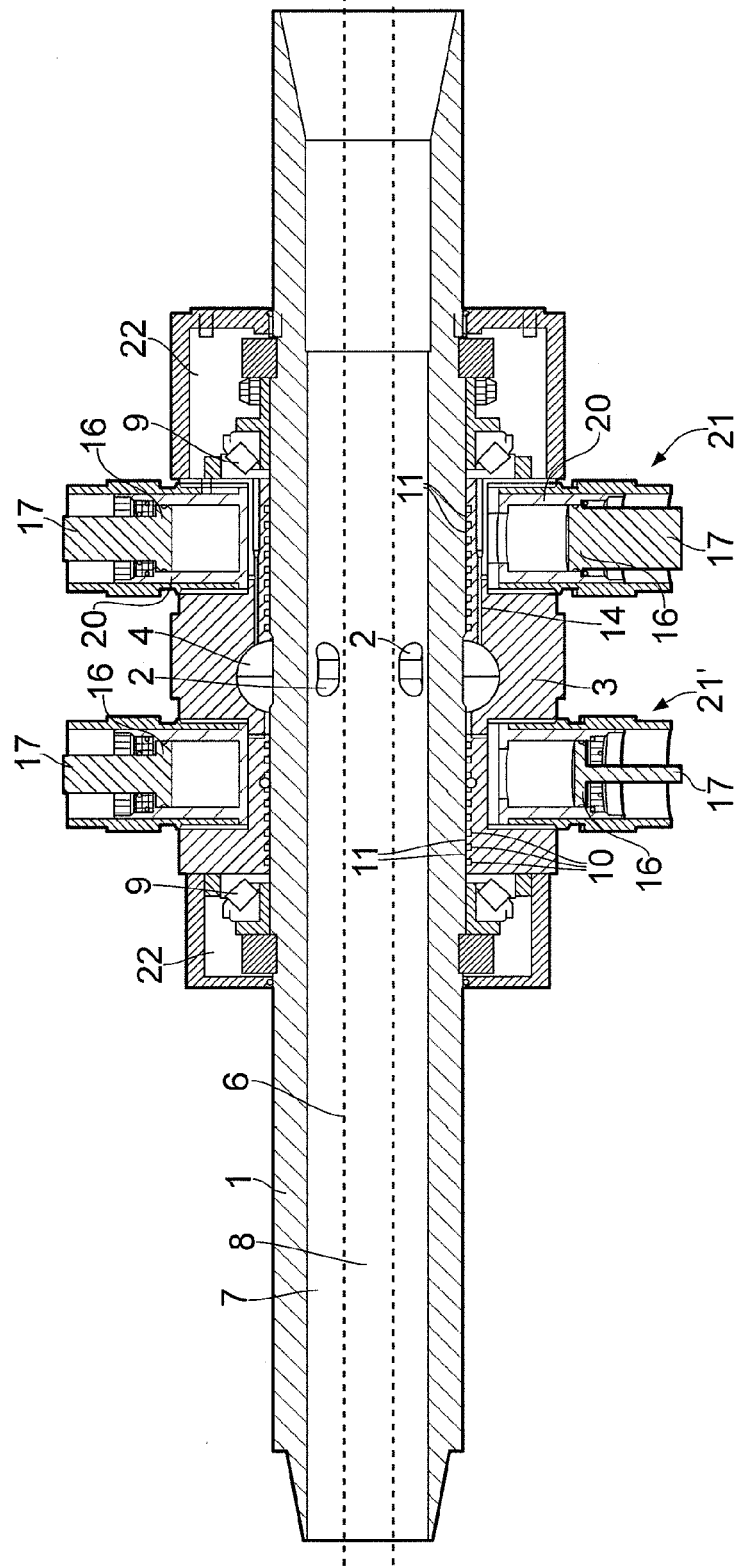
FIG. 2 is a cross section of the system in FIG. 1.

As shown in FIG. 2 which is a cross section of the element in FIG. 1 the drill pipe 1 is formed with holes 2 through the wall of the drill pipe 1. These holes 2 leads to an inner annular cavity 4 formed in the inner surface of the washpipe 3. This inner annular cavity 4 is in connection with the opening 5. Between the opposing surfaces of the washpipe 3 and the drill pipe 1 there are arranged several sealing elements 10, in series, on both sides of the annular cavity 4. The sealing elements 10 are annular sealing elements and are arranged within grooves in the washpipe 3. It is possible to envisage that the sealing elements are arranged in grooves in the drill pipe. As these sealing elements 10 are arranged around the circumference of the drill pipe 1 and in abutment against the drill pipe 1 and the washpipe 3 there are formed annular spaces 11 between two neighboring sealing elements 10. There are nine sealing elements 10 arranged in series on both sides of the annular cavity 4 in the shown example. The series of sealing elements 10 may comprise three or more sealing elements 10 forming at least two annular spaces 11. There may be for instance five, six, seven or eight sealing elements forming four, five, six or seven annular spaces. According to one or more embodiments of the present invention, there are similar series of sealing elements 10 on both sides of the annular cavity 4.

The wash pipe 3 is formed between two pipe flanges 22 attached to the drill pipe 1 with bearing arrangements 9 between the washpipe 3 and the pipe flanges 22 allowing and supporting relative rotational movement between the drill pipe 1 and the washpipe 3. Another configuration is possible for allowing such relative movement. There is partly within the washpipe 3 arranged several compensator devices 21. The compensator devices 21 comprises a cylinder 20, wherein there is arranged a movable piston 16. The cylinders 20 and pistons 16 are similar for all the compensator devices 21. There is a sealing connection between the pistons and cylinders. To the piston 16 there is attached a piston rod 17. The cross sectional area of the piston rod 17 is varied from one compensator device 21 to the next compensator device 21'. As one can see from FIG. 1 the piston rods 17 extend out of the compensator device and work as a visual aid. The compensator devices 21 are also positioned partly within the washpipe 3 and arranged around the washpipe 3. There are as indicated with the process fluid line 14 in the washpipe 3 from the annular cavity 4 to the different compensators 21 provided internally bores to avoid external fluid lines for process fluid and barrier fluid to the different compensator devices 21. Such a construction will give a compact device with minimal external fluid lines.

Figure 3:
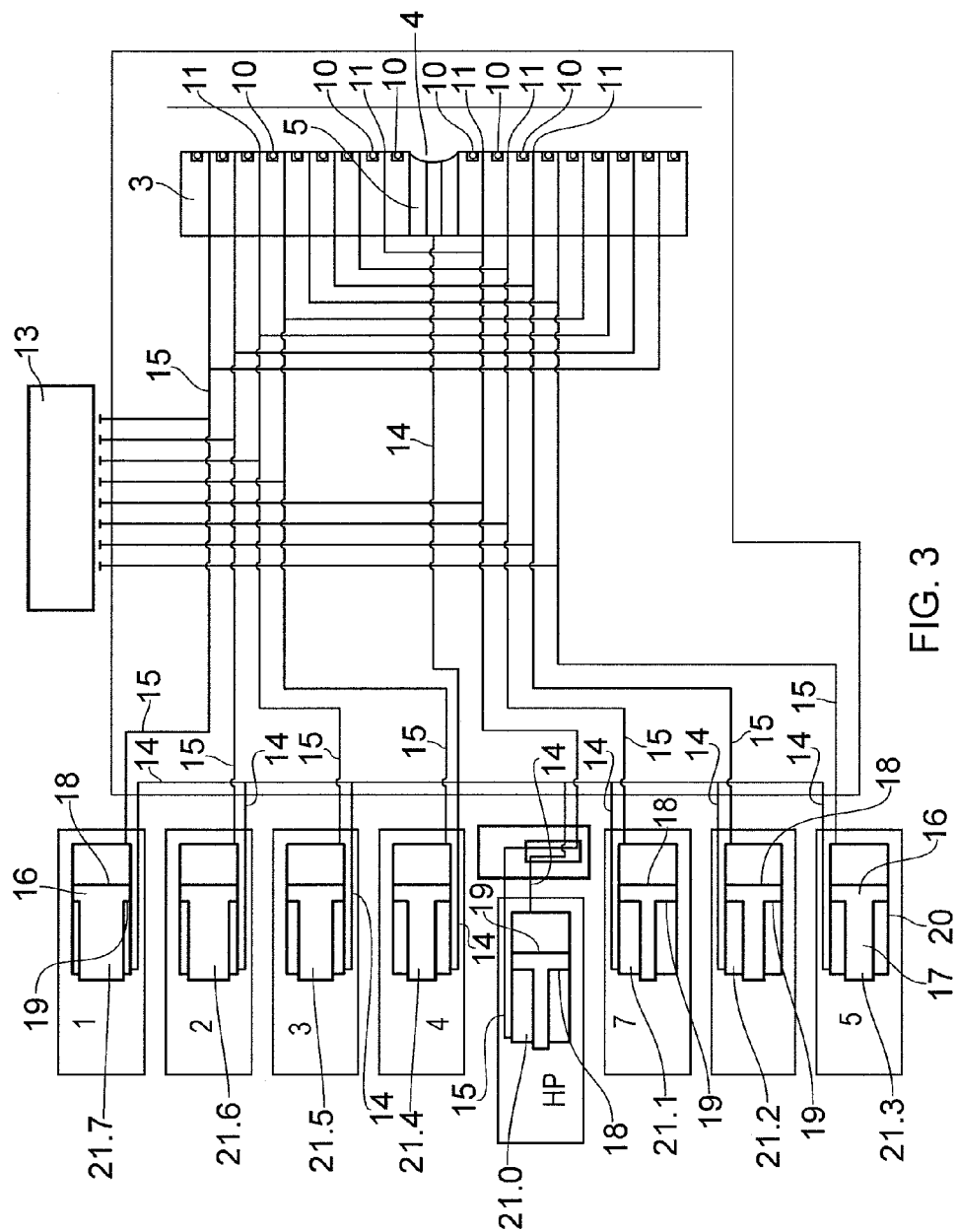
FIG. 3 is a schematic sketch of the barrier fluid system in the sealing system.

The connection between the different compensators 21, the different process fluid lines 14 and barrier fluid lines 15 and the different spaces 11 between the sealing elements 10 are schematically given in FIG. 3. The stationary element 3 with the grooves and the different sealing elements 10 are shown. Also in one or more embodiments of the present invention, there are nine sealing elements 10 in series on both sides of the annular cavity 4 leading to the opening 5 for the process fluid. To the cavity 4 and or the opening there are connected a process fluid line 14, guiding the pressure in the process fluid to the different compensators 21. There are eight compensators 21 all with similar cylinders 20 wherein there are arranged pistons 16. To the pistons 16 there are attached piston rods 17. The process fluid lines 14 leads to a given side of the piston 16. The pistons 16 have a first cross sectional area 18 and a second cross sectional area 19. The process fluid lines 14 leads to the side of the piston 16 with the second cross sectional area 19. There are in the system also a barrier fluid source 13, connectable to the barrier fluid lines 15 leading to the spaces 11 between the different sealing elements 10 and to the compensators 21. The barrier fluid lines 15 lead to the side of the piston 16 with the first cross sectional area 18. The area differences between the first cross sectional area 18 and the second cross sectional area 19, given by the cross sectional area 18 divided by the cross sectional area 19, are different for all the compensators 21.

There is one high pressure compensator 21.0 where the barrier fluid line 15 is connected to the first cross sectional area 18 where there to this side is connected a piston rod 17 and the second cross sectional area 19 is the full area of the cylinder 20. This high pressure compensator 21.0 is connected to the space 11 between the sealing element 10 closest to the process fluid and the neighboring sealing element 10. The high pressure compensator 21.0 provides a pressure in the barrier fluid delivered to the space 11 which is somewhat larger than the pressure in the process fluid in the annular cavity 4. This higher pressure in the barrier fluid will give a leakage of the barrier fluid towards the process fluid, thereby preventing unnecessary abrasion of the sealing element 10 closest to the process fluid. The first compensator 21.1 is formed with the piston rod 17 connected to the second cross sectional area 19 of the piston 16. The process fluid lines 14 are connected to this second cross sectional area 19 and the barrier fluid lines 15 are connected to the first cross sectional area 18. The first compensator 21.1 delivers a barrier fluid with a pressure somewhat lower than the process fluid and is connected to the space 11 neighboring the space 11 connected to the high pressure compensator 21.0.

The second compensator 21.2, the third compensator 21.3 etc all deliver a barrier fluid pressure to different spaces 11, reducing the pressure in the spaces 11 gradually the further from the annular cavity 4 the space 11 is positioned. Outside the space 11 connected to the seventh compensator 21.7 it is the pressure of the environment. All the compensators 21 are connected to two spaces 11, one on each side of the annular cavity 4, mirroring the sealing system on both sides of the annular cavity 4. There is indicated a barrier fluid supply 13. This may be used to fill the barrier fluid lines 14 to a given pressure before the sealing system is attached to the process fluid pressure. By such a system one is dividing the process fluid pressure between all the compensators, where the division of pressures on the different spaces 11 in sealing system is given by the difference in cross sectional area across the pistons 16.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A sealing system between a relatively rotating element and a stationary element of a dual drill pipe, comprising:
   at least three sealing elements arranged in series between the rotating element and the stationary element and between a process fluid and an environment; and
   a barrier fluid arrangement to provide a barrier fluid to spaces formed between the sealing elements, the barrier fluid arrangement comprising at least two compensator devices;
   wherein a first of the compensator devices is arranged to provide a pressure in the barrier fluid in a first of the spaces that is higher than a pressure in the process fluid, wherein the first of the compensator devices comprises a first piston with a first piston first side and a first piston second side, wherein a cross sectional area of the first piston first side is smaller than a cross sectional area of the first piston second side, and wherein the first piston first side is in communication with the barrier fluid in the first of the spaces and the first piston second side is in communication with the process fluid;
   wherein a second of the compensator devices comprises a second piston with a second piston first side and a second piston second side, wherein a cross sectional area of the second piston first side is smaller than a cross sectional area of the second piston second side, and wherein the second piston first side is in communication with the process fluid and the second piston second side is in communication with the barrier fluid in a second of the spaces;
   wherein a difference between cross sectional areas of the first piston first side and first piston second side is different from a difference between the cross sectional areas of the second piston first side and second piston second side.

2. The sealing system according to claim 1,
   wherein the piston in the compensator device is arranged with a piston rod on one side, and wherein the cross sectional area of the piston rod is used to adapt the difference in the cross sectional area of the two sides of the piston.

3. The sealing system according to claim 2, wherein the piston rods are extending out of the compensator devices as a visual indicator.

4. The sealing system according to claim 2, wherein the compensator devices comprise cylinders for positioning of the piston, which cylinders have a similar inner diameter for several of the compensator devices in the sealing system.

5. The sealing system according to claim 4, wherein there is one fluid supply of barrier fluid to at least two compensator devices.

6. The sealing system according to claim 4, wherein the rotating element is a drill pipe and the stationary element is a wash pipe and there is a radial opening from the drill pipe through the wash pipe.

7. The sealing system according to claim 2, wherein there is one fluid supply of barrier fluid to the at least two compensator devices.

8. The sealing system according to claim 7, wherein the rotating element is a drill pipe and the stationary element is a wash pipe and there is a radial opening from the drill pipe through the wash pipe.

9. The sealing system according to claim 2, wherein the rotating element is a drill pipe and the stationary element is a wash pipe and there is a radial opening from the drill pipe through the wash pipe.

10. The sealing system according to claim 1, wherein the compensator devices comprise cylinders for positioning of the piston, which cylinders have a similar inner diameter for several of the compensator devices in the sealing system.

11. The sealing system according to claim 10, wherein the rotating element is a drill pipe and the stationary element is a wash pipe and there is a radial opening from the drill pipe through the wash pipe.

12. The sealing system according to claim 1, wherein there is one fluid supply of barrier fluid to the at least two compensator devices.

13. The sealing system according to claim 12, wherein the rotating element is a drill pipe and the stationary element is a wash pipe and there is a radial opening from the drill pipe through the wash pipe.

14. The sealing system according to claim 1, wherein the rotating element is a drill pipe and the stationary element is a wash pipe and there is a radial opening from the drill pipe through the wash pipe.

15. The sealing system according to claim 14, wherein the compensator device is providing a barrier fluid to two spaces between two sealing elements, one space on either side of the radial opening.

16. The sealing system according to claim 1, wherein the at least two compensator devices are arranged at least partly within the outer relatively stationary element.

17. The sealing system according to claim 1, wherein the cross sectional area of the pistons in the compensator devices, exposed to the pressure in the process fluid, are mainly equal for all the compensator devices.

18. The sealing system of claim 1, wherein the first of the spaces is between one of the sealing elements that is exposed to the process fluid and another of the sealing elements.

19. The sealing system of claim 1, wherein the second of the compensator devices is arranged to provide a pressure in the second of the spaces that is lower than the pressure in the process fluid.

20. A method for operating a sealing system between a relatively rotating element and a stationary element of a dual drill pipe, the method comprising:
arranging at least three sealing elements in series between the rotating element and the stationary element and between a process fluid and an environment,
arranging a barrier fluid arrangement to provide a barrier fluid to spaces formed between the sealing elements and to provide a pressure in the barrier fluid in a first of the spaces that is larger than a pressure in the process fluid, wherein the arranging the barrier fluid arrangement comprises connecting a first compensator device to the first of the spaces and a second compensator device to a second of the spaces, wherein the first compensator device comprises a first piston having a first piston first side in communication with the barrier fluid in the first of the spaces and a first piston second side in communication with the process fluid, wherein a cross sectional area of the first piston first side is smaller than a cross sectional area of the first piston second side, wherein the second compensator device comprises a second piston having a second piston first side in communication with the process fluid and a second piston second side in communication with the barrier fluid in the second of the spaces, wherein a cross sectional area of the second piston first side is smaller than a cross sectional area of the second piston second side, and wherein a difference between cross sectional areas of the first piston first side and first piston second side is different from a difference between the cross sectional areas of the second piston first side and second piston second side, and
adapting the difference in the cross sectional areas of the pistons of the different compensator devices such that the pressure difference between the process fluid and the environment is divided between the different compensator devices.

* * * * *